(12) United States Patent
Onishi et al.

(10) Patent No.: US 7,265,177 B2
(45) Date of Patent: Sep. 4, 2007

(54) RESIN COMPOSITION

(75) Inventors: Hideshi Onishi, Kurashiki (JP);
Masashi Sogawa, Yokohama (JP)

(73) Assignee: The Nippon Synthetic Chemical Industry Co., Ltd., Osaka-shi (JP)

( * ) Notice: Subject to any disclaimer, the term of this patent is extended or adjusted under 35 U.S.C. 154(b) by 425 days.

(21) Appl. No.: 10/717,131

(22) Filed: Nov. 19, 2003

(65) Prior Publication Data

US 2004/0143049 A1   Jul. 22, 2004

(30) Foreign Application Priority Data

Nov. 19, 2002   (JP) ............................. 2002-334876

(51) Int. Cl.
*C08K 3/26* (2006.01)
*C08K 3/24* (2006.01)
*C08K 5/98* (2006.01)
*C08L 29/04* (2006.01)
*C08L 23/02* (2006.01)
*B32B 27/08* (2006.01)

(52) U.S. Cl. ...................... 524/502; 524/399; 524/434; 524/436; 524/503; 260/241; 260/897; 161/252; 161/254

(58) Field of Classification Search ................. 524/502, 524/503, 399, 434; 161/252; 260/897
See application file for complete search history.

(56) References Cited

U.S. PATENT DOCUMENTS 3,847,728 A * 11/1974 Hirata et al. ................. 428/518
4,954,557 A *  9/1990 Iwanami et al. ............ 524/399
4,963,608 A   10/1990 Kunieda et al.

FOREIGN PATENT DOCUMENTS

| EP | 1 043 361 A1 | 11/2000 |
| EP | 1043361 A1 * | 11/2000 |
| JP | 2000-053812 A | 2/2000 |
| JP | 2000-53812 A1 * | 2/2000 |
| JP | EP-1043361 A1 * | 11/2000 |
| JP | EP 1043361 A1 * | 11/2000 |

* cited by examiner

Primary Examiner—Duane Smith
Assistant Examiner—Ives Wu
(74) Attorney, Agent, or Firm—Leydig, Voit & Mayer, Ltd.

(57) ABSTRACT

The present invention provides a resin composition containing a polyolefin resin (A), a metal soap (B), a saponified product (C), and a hydrotalcite compound and/or a hydrotalcite solid solution (D). The resin composition shows superior long-run formability (surface smoothness, suppression of fish eye, pigment dispersibility), suppressive effect on die build-up and superior transparency and gas barrier property when added to a regrind layer during formation of a laminate having the regrind layer. Therefore, the composition is highly useful as an additive for collected materials (regrind) for forming various laminates.

13 Claims, No Drawings

RESIN COMPOSITION

TECHNICAL FIELD OF THE INVENTION

The present invention relates to a resin composition useful in reusing wastage and the like of a laminate having a layer of a thermoplastic resin, such as polyolefin resin and the like, and a layer containing a saponified product of an ethylene-vinyl acetate copolymer as a regrind (collected material). More particularly, the present invention relates to a resin composition capable of improving various long-run formabilities when added to a regrind layer during the reusing.

BACKGROUND OF THE INVENTION

Various formed products have been conventionally obtained by melt forming a mixture of a thermoplastic resin, represented by polyolefin resins such as polyethylene and polypropylene, and a saponified product of an ethylene-vinyl acetate copolymer (hereinafter sometimes to be abbreviated as EVOH). The object of this technique is largely divided into two: (1) achieving properties that cannot be afforded by individual resin and (2) reuse (scrap return or regrind) upon collection of waste material and end parts of products or defective products resulting from production of laminate structures of a thermoplastic resin and EVOH. The reuse of (2) is industrially highly useful in consideration of recycled use of industrial waste materials and global environment.

When, however, laminate structures, such as film, sheet, cup, bottle and the like made from the above-mentioned thermoplastic resin and EVOH, are formed and scrap produced during the forming is melt formed and used again as a regrind (collected material) layer in one or more layers of laminate structures such as film, sheet, cup, bottle and the like, this composition in the regrind layer may be gelled during forming or a problem of what is called degraded long-run formability occurs, where a heat colored resin called burning and carbonized resin adhere to the inside of an extruder and prevent long-term continuous melt forming. In addition, since gelled products and heat deteriorated products from the melt forming, which are sometimes contained in the formed products, mainly cause defects of formed products, such as occurrence of fish eye in the case of film forming, thereby inevitably degrading the quality of products. Moreover, since the laminate structures often contain inorganic or organic coloring agents and the like, they aggregate in the regrind layer and may impair smoothness of the laminate surface.

To improve such long-run formability and the like, therefore, a resin composition containing a higher fatty acid metal salt, hydrotalcite and the like in a composition of a saponified product of an ethylene-vinyl acetate copolymer and a thermoplastic resin, such as a polyolefin resin, has been proposed (e.g., JP-A-8-311254).

However, with the technique disclosed in JP-A-8-311254, a certain improving effect relating to long-run formability, such as suppression of degraded products and the like, but it has been clarified that the use of a highly transparent laminate as a regrind causes lower transparency, thus preventing production of a product maintaining the same level of transparency with the original laminate, and regrind treatment of a laminate containing a coloring agent results in possible aggregation of the coloring agent in a regrind layer.

SUMMARY OF THE INVENTION

Accordingly, the present inventors have intensively studied with the aim to solve the above-mentioned problems and found that a resin composition containing a polyolefin resin (A), a metal soap (B) of the following formula (1), which is obtained by a heat reaction by a dry direct method of one or ore kinds of aliphatic monocarboxylic acid having 12 to 30 carbon atoms and an oxide or hydroxide of group II metal of the periodic table, a saponified product (C) of an ethylene-vinyl acetate copolymer having an ethylene content of 70-95 mol % and a saponification degree of a vinyl acetate component of not less than 85 mol %, and a hydrotalcite compound and/or a hydrotalcite solid solution (D) can solve the above-mentioned problems, and completed the present invention:

$$\alpha MO \cdot M(OOCR)_2 \qquad (1)$$

wherein $\alpha$ is a number of 0.1-1.0, M is a divalent metal of group II of the periodic table, and R is a saturated or unsaturated alkyl group having 11 to 29 carbon atoms.

DETAILED DESCRIPTION OF THE INVENTION

The present invention is explained in detail in the following.

The polyolefin resin (A) to be contained in the resin composition of the present invention is not particularly limited and may be, for example, a wide range of polyolefin resins including olefin homopolymers and copolymers such as linear low density polyethylene (LLDPE), low density polyethylene (LDPE), very low density polyethylene (VLDPE), medium density polyethylene (MDPE), high density polyethylene (HDPE), ethylene-vinyl acetate copolymer (EVA), ionomer, ethylene-propylene (block or random) copolymer, ethylene-acrylic acid copolymer, ethylene-acrylic acid ester copolymer, ethylene-methacrylic acid copolymer, ethylene-methacrylic acid ester copolymer, polypropylene (PP), propylene-α-olefin (α-olefin having 4 to 20 carbon atoms) copolymer, polybutene, polypentene, polymethylpentene and the like, graft-modified products of these olefin homopolymers and copolymers with unsaturated carboxylic acid or ester thereof and the like. Of these, polypropylene (PP) and polyethylene (LLDPE, LDPE, VLDPE, MDPE, HDPE) are preferably used.

The metal soap (B) obtained by heating one or more kinds of aliphatic monocarboxylic acid having 12 to 30 carbon atoms and an oxide or hydroxide of group II metal of the periodic table to be used in the present invention by a dry direct method is expressed by the following formula (1):

$$\alpha MO \cdot M(OOCR)_2 \qquad (1)$$

wherein $\alpha$ is a number of 0.1-1.0, M is a divalent metal of group II of the periodic table, and R is a saturated or unsaturated alkyl group having 11 to 29 carbon atoms.

That is, it is obtained by heating one or more kinds of aliphatic monocarboxylic acid having 12 to 30 carbon atoms (B1) and an oxide or hydroxide of group II metal of the periodic table (B2) by a dry direct method. Preferably, a metal soap obtained by an excess reaction of one or more kinds of aliphatic monocarboxylic acid having 12 to 30 carbon atoms (B1) with an oxide or hydroxide of group II metal of the periodic table (B2) using amounts exceeding the reaction equivalent amounts is used.

As such aliphatic monocarboxylic acid having 12 to 30 carbon atoms (B1), lauric acid, myristic acid, palmitic acid, stearic acid, eicosanoic acid, heptadecylic acid, behenic acid, oleic acid, elaidic acid, erucic acid, linolic acid, linolenic acid, ricinoleic acid, hydroxystearic acid, montanic acid, isostearic acid, epoxystearic acid and the like can be mentioned, wherein a part thereof may be substituted for carboxylic acid or dicarboxylic acid other than aliphatic monocarboxylic acid.

As the oxide or hydroxide of group II metal of the periodic table (B2), oxides and hydroxides of alkaline earth metal, zinc group metal and the like are used, with preference given to oxides and hydroxides of magnesium, calcium, zinc and the like.

For production of metal soap (B), (B1) and (B2) are heated by a dry direct method as mentioned above. To be precise, (B1) is heated to 120-140° C., (B2) is added thereto, and after addition of the entire amount, the mixture is heated to 160-180° C. and stirred for 20-30 minutes, whereby the mixture is dissolved to give transparent metal soap (B). In the present invention, a metal soap obtained by an excess reaction comprising reacting (B1) with (B2) using amounts more than reaction equivalents is preferably used. In other words, it is preferable to make the metal content of metal soap (B) to be 0.1-1.0 mol (further, 0.1-0.8 mol) higher than the corresponding equivalent amount. When the excess mol number is less than 0.1 mol, a sufficient effect of the present invention is difficult to achieve, whereas when it exceeds 1.0 mol, unreacted (B2) unpreferably remains in the metal soap (B). While wet deposition methods are available besides dry direct method for the production of a metal soap, this wet deposition method involves reaction in water, which places a limit on the reaction temperature, and it is difficult to obtain metal soap (B) to be used in the present invention, which has a metal content exceeding the reaction equivalent amount by not less than 0.1 mol.

As the metal soap (B) as mentioned above, commercially available products such as EM-112 and EM-144 manufactured by Eishin Kasei KK, and the like can be mentioned.

The saponified product of an ethylene-vinyl acetate copolymer (C) to be used in the present invention has an ethylene content of 70-95 mol % (further 75-92 mol %, particularly 80-90 mol %) and a saponification degree of a vinyl acetate component of not less than 85 mol % (further not less than 90 mol %, particularly not less than 95 mol %). When the ethylene content is less than 70 mol % or more than 95 mol %, compatibility becomes insufficient and the object of the present invention is difficult to achieve. When the saponification degree of the vinyl acetate component is less than 85 mol %, the compatibility becomes insufficient and the object of the present invention is difficult to achieve.

The melt flow rate (MFR) (210° C., loading 2160 g) of the saponified product of an ethylene-vinyl acetate copolymer (C) is preferably 0.5-200 g/10 min (further, 1-100 g/10 min, particularly 3-50 g/10 min). When the melt flow rate is less than 0.5 g/10 min, the resin pressure during melt forming strikingly increases and when it exceeds 200 g/10 min, a flow failure unpreferably occurs.

A saponified product of an ethylene-vinyl acetate copolymer (C) is obtained by saponification of the ethylene-vinyl acetate copolymer, and the ethylene-vinyl acetate copolymer is produced by any known polymerization method, such as solution polymerization, suspension polymerization, emulsion polymerization and the like. The saponification of the ethylene-vinyl acetate copolymer can be performed according to a known method.

According to the present invention, moreover, a copolymerizable ethylenic unsaturated monomer may be copolymerized as long as the effect of the present invention is not inhibited. As such monomer, olefins such as propylene, 1-butene, isobutene and the like, unsaturated acids such as acrylic acid, methacrylic acid, crotonic acid, (anhydrous) phthalic acid, (anhydrous) maleic acid, (anhydrous) itaconic acid and the like and salts thereof or mono- or di-$C_{1-18}$ alkyl esters thereof (as used herein, "$C_{1-18}$" means that the carbon number is 1 to 18, hereinafter the same), acrylamides such as acrylamide, N—$C_{1-18}$ alkylacrylamide, N,N-dimethylacrylamide, 2-acrylamidepropanesulfonic acid and salts thereof, acrylamidepropyldimethylamine and acid salts thereof and quaternary salts thereof and the like, methacrylamides such as ethacrylamide, N—$C_{1-18}$ alkylmethacrylamide, N,N-dimethylmethacrylamide, 2-methacrylamidepropanesulfonic acid or a salt thereof, methacrylamidepropyldimethylamine and acid salts thereof and quaternary salts thereof and the like, N-vinylamides such as N-vinylpyrrolidone, N-vinylformamide, N-vinylacetamide and the like, vinyl cyanates such as acrylonitrile, methacrylonitrile and the like, vinyl ethers such as $C_{1-18}$ alkyl vinyl ether, hydroxyalkyl vinyl ether, alkoxyalkyl vinyl ether and the like, halogenated vinyls such as vinyl chloride, vinylidene chloride, vinyl fluoride, vinylidene fluoride, vinyl bromide and the like, vinylsilanes such as trimethoxyvinylsilane and the like, allyl acetate, allyl chloride, allyl alcohol, dimethylallyl alcohol, trimethyl-(3-acrylamide-3-dimethylpropyl)ammonium chloride, acrylamide-2-methylpropanesulfonic acid and the like can be mentioned. They may be post-modified by urethanation, acetalation, cyanoethylation and the like, as long as the gist of the present invention is not impaired. It is also possible to use a saponified product of an ethylene-vinyl acetate copolymer containing silicon, such as the one described in, for example, JP-A-60-144304, as (C).

The hydrotalcite compound for hydrotalcite compound and/or hydrotalcite solid solution (D) to be used in the present invention is, for example, a compound of the formula:

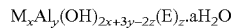

wherein M is Mg, Ca or Zn, E is $CO_3$ or $HPO_4$, and x, y and z is a positive number, a is 0 or a positive number). Specific examples thereof include $Mg_{4.5}Al_2(OH)_{13}CO_3 \cdot 3.5H_2O$, $Mg_5Al_2(OH)_{14}CO_3 \cdot 4H_2O$, $Mg_6Al_2(OH)_{16}CO_3 \cdot 4H_2O$, $Mg_8Al_2(OH)_{20}CO_3 \cdot 5H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_6(OH)_{16}CO_3 \cdot 4H_2O$ and the like. In addition to the above, for example, a compound that cannot be represented by a clear chemical formula, wherein a part of OH in $Mg_2Al(OH)_9 \cdot 3H_2O$ has been substituted for $CO_3$ or $HPO_4$ and a compound from which crystal water has been removed (a=0) are expected to provide an equivalent effect. Of these, a compound wherein M is Mg and E is $CO_3$ is particularly preferable, because it is effective for achieving long-run formability and suppression of foreign substances (die buildup) produced by phase separation.

Moreover, as a hydrotalcite solid solution, for example, a compound of the formula:

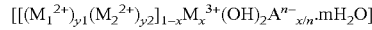

wherein $M_1^{2+}$ is at least one kind of metal selected from Mg, Ca, Sr and Ba, $M_2^{2+}$ is a metal selected from Zn, Cd, Pb and Sn, $M_x^{3+}$ is a trivalent metal, $A^{n-}$ is an anion having an n value, and x, y1, y2 and m are each a positive number shown by $0 < x \leq 0.5$, $0.5 < y1 < 1$, $y1+y2=1$ and $0 \leq m \leq 2$, respectively. In the above-mentioned formula, for example, $M_1^{2+}$ is preferably Mg or Ca, $M_2^{2+}$ is preferably Zn or Cd, and $M_x^{3+}$ is preferably Al, Bi, In, Sb, B, Ga, Ti and the like, which is practically Al. As $A^{n-}$, $CO_3^{2-}$, $OH^-$, $HCO_3^-$, salicylate ion, citrate ion, tartrate ion, $NO_3^-$, $I^-$, $(OOC-COO)^{2-}$, $ClO_4^{-}$, $CH_3COO^-$, $CO_3^{2-}$, $(OOCHC=CHCOO)^{2-}$ and [Fe(CN)$_6$]$^{4-}$ can be mentioned, and $CO_3^{2-}$ and $OH^-$ are useful.

Specific examples of the hydrotalcite solid solution include [Mg$_{0.75}$ Zn$_{0.25}$]$_{0.67}$Al$_{0.33}$(OH)$_2$(CO$_3$)$_{0.165}$·0.45H$_2$O, [Mg$_{0.79}$ Zn$_{0.21}$]$_{0.7}$Al$_{0.3}$(OH)$_2$(CO$_3$)$_{0.15}$, [Mg$_{1/7}$Ca$_{3/7}$Zn$_{3/7}$]$_{0.7}$Al$_{0.3}$(OH)$_2$(OOCHC=CHCOO)$_{0.15}$·0.41H$_2$O, [Mg$_{6/7}$Cd$_{1/7}$]$_{0.7}$Al$_{0.3}$(OH)$_2$(CH$_3$COO)$_{0.3}$·0.34H$_2$O, [Mg$_{5/7}$Pd$_{2/7}$]$_{0.7}$Al$_{0.30}$(OH)$_2$(CO$_3$)$_{0.15}$·0.52H$_2$O, [Mg$_{0.74}$ Zn$_{0.26}$]$_{0.68}$Al$_{0.32}$(OH)$_2$(CO$_3$)$_{0.16}$, [Mg$_{0.56}$ Zn$_{0.44}$]$_{0.68}$Al$_{0.32}$(OH)$_2$(CO$_3$)$_{0.16}$·0.2H$_2$O, [Mg$_{0.81}$ Zn$_{0.19}$]$_{0.74}$Al$_{0.26}$(OH)$_2$(CO$_3$)$_{0.13}$, [Mg$_{0.75}$ Zn$_{0.25}$]$_{0.8}$Al$_{0.20}$(OH)$_2$(CO$_3$)$_{0.10}$·0.16H$_2$O, [Mg$_{0.71}$ Zn$_{0.29}$]$_{0.7}$Al$_{0.30}$(OH)$_2$(NO$_3$)$_{0.30}$, [Mg$_{0.71}$ Zn$_{0.29}$]$_{0.7}$Al$_{0.30}$(OH)$_2$(OOCHC=CHCOO)$_{0.15}$, [Mg$_{0.14}$ Ca$_{0.57}$Zn$_{0.28}$]$_{0.7}$Al$_{0.30}$(OH)$_{2.3}$·0.25H$_2$O and the like can be mentioned, of which [Mg$_{0.75}$ Zn$_{0.25}$]$_{0.67}$Al$_{0.33}$(OH)$_2$(CO$_3$)$_{0.165}$·0.45H$_2$O, [Mg$_{0.79}$ Zn$_{0.21}$]$_{0.7}$Al$_{0.3}$(OH)$_2$(CO$_3$)$_{0.15}$, [Mg$_{6/7}$Cd$_{1/7}$]$_{0.7}$Al$_{0.3}$(OH)$_2$(CH$_3$COO)$_{0.3}$·0.34H$_2$O and [Mg$_{5/7}$Pd$_{2/7}$]$_{0.7}$Al$_{0.30}$(OH)$_2$(CO$_3$)$_{0.15}$·0.52H$_2$O are preferable, because they are effective for achieving long-run formability and suppression of foreign substances (die build-up) produced due to phase separation.

The resin composition of the present invention contains the above-mentioned (A)-(D). While the content ratios thereof are not particularly limited, the content ratio of (A) and (C), (A/C), is preferably 95/5-30/70 (further 90/10-40/60, particularly 85/15-50/50) (both in weight ratio). When the content ratio exceeds 95/5, the action effect of the present invention becomes insufficient and when it is less than 30/70, compatibility sometimes becomes unpreferably insufficient.

The content ratio of metal soap (B) is preferably 0.005-20 wt % (further 0.007-15 wt %, still further 0.01-12 wt %, particularly 0.015-10 wt %) of the resin composition. When the ratio is less than 0.005 wt %, the action effect of the present invention becomes insufficient and when it exceeds 20 wt %, inconvenience such as foaming of the formed product and the like unpreferably occurs.

The content ratio of the hydrotalcite compound and/or hydrotalcite solid solution (D) is preferably 0.005-20 wt % (further 0.01-15 wt %, still further 0.02-12 wt %, particularly 0.05-10 wt %) of the resin composition. When the content ratio is less than 0.005 wt %, the action effect of the present invention becomes insufficient and when it exceeds 20 wt %, the formed product unpreferably becomes brittle.

For all of the above-mentioned (A)-(D), two or more kinds of compounds can be used in combination. When two or more kinds of compounds are used in combination, the total contents are preferably within the above-mentioned range.

The resin composition of the present invention contains the above-mentioned (A)-(D). For production of such resin composition, the method is not particularly limited, and (1) a method comprising mixing (A)-(D) at once and then melt kneading the mixture, (2) a method comprising melt mixing (A), (B) and (D) in advance, and then melt mixing (C) with the melt mixture, (3) a method comprising melt mixing a melt mixture of (A) and (B), and a melt mixture of (C) and (D), (4) a method comprising melt mixing a melt mixture of (A) and (D) and a melt mixture of (C) and (B), (5) a method comprising melt mixing (A), (C) and (D) and then adding (B) to the melt mixture and the like can be mentioned. In view of the production efficiency, the method (1) is preferable.

In this way, the resin composition of the present invention can be obtained. In the present invention, lubricants such as saturated aliphatic amides (e.g., stearic acid amide etc.), unsaturated fatty acid amides (e.g., oleic acid amide etc.), bis-fatty acid amides (e.g., ethylenebis-stearic acid amide etc.), fatty acid metal salts (e.g., calcium stearate, magnesium stearate, zinc stearate etc.), low molecular weight polyolefins (e.g., low molecular weight polyethylene having a molecular weight of about 500-10,000, or low molecular weight polypropylene etc.) and the like, organic acids (e.g., acetic acid, propionic acid, stearic acid etc.), inorganic acids (e.g., boric acid, phosphoric acid etc.), inorganic salts (except hydrotalcite), plasticizers (e.g., aliphatic polyhydric alcohol such as ethylene glycol, glycerine, hexanediol etc. and the like), oxygen absorbers (e.g., reduced iron powders, potassium sulfite, ascorbic acids, hydroquinone, gallic acid and the like), heat stabilizers, light stabilizers, antioxidants free of amide group, UV absorbers, coloring agents, antistatic agents, surfactants, antibiotic agents, antiblocking agents, slipping agents, fillers (e.g., inorganic filler etc.), other resins (e.g., polyester etc.) and the like may be added to the resin composition as long as the object of the present invention is not inhibited.

In this way, the resin composition of the present invention can be obtained. Such resin composition is useful as an additive when a laminate having a layer of a thermoplastic resin, particularly a laminate having a layer of a thermoplastic resin and a layer of a saponified product of an ethylene-vinyl acetate copolymer is to be reused. The composition is added to a collected material which is typically a ground product of the laminate. Such utility is explained in detail in the following.

As the thermoplastic resin to be used for such laminate is not particularly limited and polyolefin resin, polyester resin, polyamide resin, copolymerized polyamide, polystyrene resin, polyvinyl chloride resin, polyvinylidene chloride, acrylic resin, vinyl ester resin, polyester elastomer, polyurethane elastomer, chlorinated polyethylene, chlorinated polypropylene, aromatic and aliphatic polyketone, aliphatic polyalcohol and the like can be mentioned, with preference given to a polyolefin resin.

Examples of the polyolefin resin include a wide range of polyolefin resins including homopolymers and copolymers of olefins such as linear low density polyethylene (LLDPE), low density polyethylene (LDPE), very low density polyethylene (VLDPE), medium density polyethylene (MDPE), high density polyethylene (HDPE), ethylene-vinyl acetate copolymer (EVA), ionomer, ethylene-propylene (block or random) copolymer, ethylene-acrylic acid copolymer, ethylene-acrylic acid ester copolymer, ethylene-methacrylic acid copolymer, ethylene-methacrylic acid ester copolymer, polypropylene (PP), propylene-α-olefin (α-olefin having 4 to 20 carbon atoms) copolymer, polybutene, polypentene, polymethylpentene and the like, blends thereof and the like. Of these, linear low density polyethylene (LLDPE), low density polyethylene (LDPE), very low density polyethylene (VLDPE), high density polyethylene (HDPE), ethylene-vinyl acetate copolymer (EVA), ethylene-propylene (block or random) copolymer, polypropylene (PP) and blends thereof are preferable because the effect of the present invention can be preferably achieved.

While EVOH to be used for such laminate is not particularly limited, one having an ethylene content of 5-70 mol % (further 15-60 mol %, particularly 20-50 mol %) and a saponification degree of a vinyl acetate component of not less than 90 mol % (further not less than 95 mol %, particularly not less than 99 mol %) is used. When the ethylene content is less than 5 mol %, gas barrier property under high humidity and melt forming property are degraded, whereas when it exceeds 70 mol %, sufficient gas barrier property cannot be achieved. When the saponification degree is less than 90 mol %, the gas barrier property, heat stability, resistance to humidity and the like are unpreferably degraded.

The melt flow rate (MFR) of EVOH is preferably 0.5-50 g/10 min (210° C., 2160 g loading), more preferably 1-35 g/10 min (same as above). When the MFR is less than 0.5 g/10 min (same as above), viscosity becomes too high to make melt extrusion difficult to perform. When it exceeds 50 g/10 min (same as above), film forming property may become unpreferably instable.

EVOH can be obtained by saponification of an ethylene-vinyl acetate copolymer. The ethylene-vinyl acetate copolymer can be produced by any known polymerization method, such as solution polymerization, suspension polymerization, emulsion polymerization and the like. The saponification of the ethylene-vinyl acetate copolymer can be performed according to a known method.

EVOH may be copolymerized with copolymerizable ethylenically unsaturated monomers. As such monomer, olefins such as propylene, 1-butene, isobutene and the like, unsaturated acids such as acrylic acid, methacrylic acid, crotonic acid, (anhydrous) phthalic acid, (anhydrous) maleic acid, (anhydrous) itaconic acid and the like and salts thereof or mono- or di-$C_{1-18}$ alkyl esters thereof, acrylamides such as acrylamide, N—$C_{1-18}$ alkylacrylamide, N,N-dimethylacrylamide, 2-acrylamidepropanesulfonic acid and salts thereof, acrylamidepropyldimethylamine and acid salts thereof and quaternary salts thereof and the like, methacrylamides such as methacrylamide, N—$C_{1-18}$ alkylmethacrylamide, N,N-dimethylmethacrylamide, 2-methacrylamidepropanesulfonic acid or a salt thereof, methacrylamidepropyldimethylamine and acid salts thereof and quaternary salts thereof and the like, N-vinylamides such as N-vinylpyrrolidone, N-vinylformamide, N-vinylacetamide and the like, vinyl cyanates such as acrylonitrile, methacrylonitrile and the like, vinyl ethers such as $C_{1-18}$ alkyl vinyl ether, hydroxy $C_{1-18}$ alkyl vinyl ether, $C_{1-18}$ alkoxy-$C_{1-18}$ alkyl vinyl ether and the like, halogenated vinyls such as vinyl chloride, vinylidene chloride, vinyl fluoride, vinyl fluoridene, vinyl bromide and the like, vinylsilanes such as trimethoxyvinylsilane and the like, allyl acetate, allyl chloride, allyl alcohol, dimethylallyl alcohol, trimethyl-(3-acrylamide-3-dimethylpropyl)ammonium chloride, acrylamide-2-methylpropanesulfonic acid and the like can be mentioned. They may be post-modified by urethanation, acetalation, cyanoethylation and the like as long as the gist of the present invention is not impaired. It is also possible to use a saponified product of an ethylene-vinyl acetate copolymer containing silicon, such as the one described in, for example, JP-A-60-144304.

According to the present invention, the long-run formability is preferably further improved when EVOH contains at least one kind selected from a boron compound, phosphoric acid or a compound thereof, and a fatty acid salt. As such boron compound, boric acid or a metal salt thereof, such as calcium borate, cobalt borate, zinc borate (zinc tetraborate, zinc metaborate etc.), aluminum potassium borate, ammonium borate (ammonium metaborate, ammonium tetraborate, ammonium pentaborate, ammonium octaborate etc.), cadmium borate (cadmium orthoborate, cadmium tetraborate etc.), potassium borate (potassium metaborate, potassium tetraborate, potassium pentaborate, potassium hexaborate, potassium octaborate etc.), silver borate (silver metaborate, silver tetraborate etc.), copper borate (cupric borate, copper metaborate, copper tetraborate etc.), sodium borate (sodium metaborate, sodium diborate, sodium tetraborate, sodium pentaborate, sodium hexaborate, sodium octaborate etc.), lead borate (lead metaborate, lead hexaborate etc.), nickel borate (orthonickel borate, nickel diborate, nickel tetraborate, nickel octaborate etc.), barium borate (barium orthoborate, barium metaborate, barium diborate, barium tetraborate etc.), bismuth borate, magnesium borate (magnesium orthoborate, magnesium diborate, magnesium metaborate, trimagnesium tetraborate, pentamagnesium tetraborate etc.), manganese borate (manganese borate, manganese metaborate, manganese tetraborate etc.), lithium borate (lithium metaborate, lithium tetraborate, lithium pentaborate etc.) and the like, as well as boric acid salt minerals such as borax, kernite, inyoite, kotoite, suanite, szaibelyite and the like, and the like can be mentioned, with preference given to the use of borax, boric acid, sodium borate (sodium metaborate, sodium diborate, sodium tetraborate, sodium pentaborate, sodium hexaborate, sodium octaborate etc.).

As the phosphoric acid and a compound thereof, phosphoric acid, sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, manganese hydrogen phosphate and the like can be mentioned, with preference given to phosphoric acid, sodium dihydrogen phosphate, potassium dihydrogen phosphate, calcium dihydrogen phosphate and magnesium dihydrogen phosphate.

As the fatty acid salt, moreover, alkali metal salt (sodium salt, potassium salt etc.) of acetic acid, propionic acid, butyric acid, lauric acid, stearic acid, oleic acid, behenic acid and the like, alkaline earth metal salt (magnesium salt, calcium salt, barium salt etc.), zinc metal salt, manganese metal salt and the like can be mentioned, with preference given to a alkali metal salt or alkaline earth metal salt of fatty acid having not more than 5 carbon atoms, such as sodium acetate, calcium acetate, magnesium acetate and the like.

While the content of the above-mentioned component is not particularly limited, when the component is a boron compound, it is preferably 0.001-1 wt % (further 0.002-0.5 wt %, particularly 0.002-0.1 wt %) of EVOH based on the weight of boron. When the component is phosphoric acid or a compound thereof, it is preferably 0.0005-0.1 wt % (further 0.001-0.05 wt %, particularly 0.002-0.03 wt %) of EVOH based on the weight of $PO_4^{3-}$. When the component is a fatty acid salt, it is preferably 0.001-0.05 wt % (further 0.0015-0.04 wt %, particularly 0.002-0.03 wt %) of EVOH based on the weight of metal. When the content of the component is less than the above-mentioned range, expression of the synergistic effect of the long-run formability of the EVOH layer and resistance to interlayer release during production of laminates becomes poor. When the content exceeds the above-mentioned range, the appearance of the resulting laminate may be unpreferably degraded. When two or more from a boron compound, phosphoric acid or a compound thereof, and fatty acid salt are used in combination as such component, each content preferably satisfies the above-mentioned required range.

The method for making EVOH containing these components is not particularly limited and any known method can be used. For example, a) a method comprising bringing porous precipitates of EVOH having a water content of 20-80 wt % in contact with an aqueous solution of the above-mentioned component to allow the solution to contain the above-mentioned components and then drying the solution, b) a method comprising allowing a uniform solution (water/alcohol solution etc.) of EVOH to contain the above-mentioned components, extruding the resulting mixture into a solidifying liquid in strands, cutting the obtained strands to give pellets and then drying the pellets, c) a method comprising mixing EVOH and the above-mentioned components at once, and melt kneading the mixture in an extruder and the like, d) a method comprising neutralizing alkali (sodium hydroxide, potassium hydroxide etc.), which was used in the saponification step, with acids such as acetic acid and the like during production of EVOH, and controlling the amount of residual acids such as acetic acid and the like and by-produced alkali metal salts such as sodium acetate, potassium acetate and the like by a washing treatment with water and the like, and the like can be mentioned. For a remarkable effect to be achieved, the methods of a), b) and d) are preferable, which are superior in dispersibility of acids and metal salts thereof.

In the present invention, moreover, EVOH may contain lubricants such as saturated aliphatic amides (e.g., stearic acid amide etc.), unsaturated fatty acid amides (e.g., oleic acid amide etc.), bis-fatty acid amides (e.g., ethylenebis-stearic acid amide etc.), low molecular weight polyolefins (e.g., low molecular weight polyethylene having a molecular eight of about 500-10,000, or low molecular weight polypropylene etc.) and the like, inorganic salts (e.g., hydrotalcite etc.), plasticizers (e.g., aliphatic polyhydric alcohols such as ethylene glycol, glycerine, hexanediol etc. and the like), oxygen absorbers (e.g., reduced iron powders, potassium sulfite, ascorbic acids, hydroquinone etc.), heat stabilizers, light stabilizers, antioxidants, UV absorbers, coloring agents, antistatic agents, surfactants, antibiotic agents, antiblocking agents (e.g., talc microparticles etc.), slipping agents (e.g., amorphous silica etc.), fillers (e.g., inorganic filler etc.), other resins (e.g., polyolefin, polyamide, polyester etc.) and the like, as long as the object of the present invention is not inhibited.

As EVOH, two or more kinds of different EVOHs can be used. In this case, an EVOH blend having an ethylene content different by not less than 5 mol %, and/or a saponification degree different by not less than 1 mol %, and/or an MFR ratio of 2 or above is used. As a result, flexibility, heat formability (stretchability during high drawing, and secondary processability such as vacuum and pneumatic forming, deep draw forming and the like), film forming stability and the like can be improved, while advantageously retaining the gas barrier property and flexion fatigue resistance of the laminate. The production method of the two or more kinds of different EVOHs is not particularly limited and, for example, a method comprising mixing respective pastes of EVA before saponification and then saponifying the mixture, a method comprising stirring a mixed solution of respective EVOHs in alcohol or water and alcohol after saponification and then pelletizing the mixture, a method comprising mixing respective EVOH pellets and melt kneading the mixture and the like can be mentioned.

While the above-mentioned laminate contains a thermoplastic resin layer and an EVOH layer, an adhesive resin layer can be formed between the layers as necessary. As such adhesive resin, various resins can be used, which are determined depending on the kind of the thermoplastic resins. For example, a modified olefin polymer containing a carboxyl group obtained by chemically binding unsaturated carboxylic acid or an anhydride thereof with an olefin polymer (the aforementioned wide sense of polyolefin resins) by addition reaction, graft reaction and the like can be mentioned. Specific preferable examples thereof include a mixture of one or more kinds selected from maleic anhydride graft-modified polyethylene, maleic anhydride graft-modified polypropylene, maleic anhydride graft-modified ethylene-propylene (block or random) copolymer, maleic anhydride graft-modified ethylene-ethylacrylate copolymer, maleic anhydride graft-modified ethylene-vinyl acetate copolymer and the like. In this case, the content of the unsaturated carboxylic acid or an anhydride thereof in the olefin polymer is preferably 0.001-3 wt %, more preferably 0.01-1 wt %, particularly preferably 0.03-0.5 wt %. When the amount of modification of the modified product is small, adhesiveness between layers sometimes becomes insufficient, and when it is large, the adhesive resin undergoes a crosslinking reaction, thereby unpreferably degrading the formability. These adhesive resins may be blended with a rubber-elastomer component such as polyisobutylene, ethylene-propylene rubber and the like, and further with other thermoplastic resin and the like. Particularly, by blending a polyolefin resin, which is a matrix of the adhesive resin, with a different polyolefin resin, the adhesiveness may beneficially improve.

While the thickness of each layer of the laminate varies depending on the layer constitution, the kind of thermoplastic resin, utility, form of container, required property and the like, it is generally about 5-5000 μm (further 30-1000 μm) for a thermoplastic resin layer, about 5-500 μm (further 10-200 μm) for an EVOH layer and about 5-400 μm (further 10-150 μm) for an adhesive resin layer.

A method for producing the laminate is not particularly limited and, for example, a method comprising melt extrusion lamination of a thermoplastic resin on an EVOH film, sheet and the like, a method comprising melt extrusion lamination conversely of EVOH on a substrate made from a thermoplastic resin, a method comprising co-extrusion of EVOH and a thermoplastic resin, a method comprising dry lamination of EVOH (layer) and a thermoplastic resin (layer) using a known adhesive such as organic titanium compound, isocyanate compound, polyester compound, polyurethane compound and the like, and the like can be mentioned. The melt forming temperature during the above-mentioned melt extrusion is often selected from the range of 150-300° C.

While the laminate can be used as it is for variously-shaped products, a heat drawing treatment is often applied to further improve the property of the laminate and to form into a desired objective shape of a container. As used herein, the heat drawing treatment means uniform forming of a thermally uniformly heated film, sheet or parison laminate into a cup, tray, tube, bottle or film by chuck, plug, vacuum force, pneumatic force, blow and the like, wherein the drawing may be either monoaxial drawing or biaxial drawing.

As drawing methods, roll drawing method, tenter drawing method, tubular drawing method, draw blowing method, vacuum forming, pneumatic forming, vacuum and pneumatic forming and the like can be mentioned. In the case of biaxial drawing, any of simultaneous biaxial drawing and sequential biaxial drawing can be used. The draw temperature is selected from the range of about 60-170° C., preferably about 80-160° C.

The shape of the obtained laminate may be any, and film, sheet, tape, cup, tray, tube, bottle, pipe, filament, irregular cross-sectional extrude and the like can be mentioned. The obtained laminate may be subjected to heat treatment, cooling treatment, rolling treatment, printing treatment, dry lamination treatment, solution or melt coating treatment, forming into bags, deep draw processing, forming into boxes, forming into tubes, forming into sprits and the like as necessary.

The resin composition of the present invention is useful for collecting and reusing (scrap return or regrind) unnecessary parts such as waste material and end parts of a product or defective products, which result from the production of a laminate having a thermoplastic resin layer and an EVOH layer as mentioned above, and particularly useful for direct blow forming (continuous, accumulator) methods producing a large amount of scrap and burr, secondary process forming (vacuum forming, pneumatic forming, vacuum and pneumatic forming etc.) methods for multilayer sheets, and the like. For example, a method comprising co-extrusion of EVOH and a thermoplastic resin, sandwiching the obtained parison with molds and blow forming with air to produce bottles and tubes, and a method comprising draw forming a multilayer sheet obtained by any method, which is made from EVOH and a thermoplastic resin, by vacuum force or pneumatic force to prepare cups and trays can be mentioned.

When reusing unnecessary parts such as waste material and end parts of a product or defective products (collected materials), which result from the production of a laminate obtained as mentioned above, it is necessary to grind and melt form them again in an extruder and the like.

For grinding such collected materials, a known grinder can be used. The shape and particle size of the ground products are not particularly limited but the products preferably have an apparent density of 0.25-0.85 g/cc (further 0.3-0.7 g/cc, particularly 0.35-0.6 g/cc). When the apparent density is less than 0.25 g/cc, dispersion of EVOH in the regrind layer becomes insufficient, and the melt formability and mechanical property of the regrind layer of the obtained formed product may be degraded, and when it exceeds 0.85 g/cc, supply failure occurs in an extruder, which in turn may unpreferably result in degraded melt formability of the regrind layer of the obtained formed product.

The apparent density can be controlled by adjusting the shape of the grind cutter of a grinder, rotation number of the grind cutter, treatment speed of grinding, the size of opening of the mesh to be used and the like.

The apparent density as used herein is measured according to the "5.3 Apparent density" test method of JIS-K6891.

In the present invention, moreover, when the content of EVOH in the ground product (collected material) is 0.1-30 wt % (further 0.3-25 wt %, particularly 0.5-20 wt %), the effect of the present invention preferably becomes particularly superior. When the EVOH content is less than 0.1 wt %, problems of degraded long-run formability and occurrence of foreign substance (die build-up) due to phase separation during melt forming of ground laminate product, and delamination between layers and lower mechanical property of the obtained formed product may not occur, thereby obliterating the necessity of improvement, whereas when it exceeds 30 wt %, the effect of the present invention may be unpreferably difficult to achieve.

While the EVOH content depends on the thickness of the EVOH layer in a laminate, when the content exceeds 30 wt %, a suitable amount of the same but fresh thermoplastic resin or a different thermoplastic resin is preferably added to make the content 30 wt % or below.

In this way, a ground product (collected material) of a laminate is obtained. For adding the resin composition of the present invention to a ground product, known mixing apparatuses such as a rocking mixer, a ribbon blender, a super mixer, a line mixer and the like can be used.

A mixture of the ground product and the resin composition (hereinafter to be referred to as a blend) can be supplied to an extruder for directly formed products, or can be supplied to an extruder for formed products, after repelletization in advance using a melt kneader such as a monoaxial extruder, a biaxial extruder and the like.

In the present invention, moreover, the blend is superior in melt formability and mechanical property even when it is supplied to an extruder for directly formed products. Thus, when productivity (economic aspect) is important, the blend may be preferably supplied directly to an extruder for formed products.

The blend can be supplied as it is to an extruder for formed products or can be supplied to an extruder upon mixing with a suitable amount of the same but fresh thermoplastic resin or a different thermoplastic resin. In the present invention, as long as the content of EVOH in the ground product does not exceed 30 wt %, the blend may be preferably directly supplied to an extruder for formed products, because it is superior in the melt formability and mechanical property, and advantageous in terms of productivity (economic aspect).

The content of the resin composition in the ground product varies depending on the layer constitution, the kind of thermoplastic resin, the content of EVOH in the ground product, utility, form of container, required property and the like, but it is generally preferably 0.5-50 parts by weight (further 1-30 parts by weight, particularly 2-10 parts by weight) per 100 parts by weight of the ground product. When the content of the resin composition is less than 0.5 part by weight, the effect of the present invention may be difficult to achieve, whereas when it exceeds 50 parts by weight, the obtained formed product may unpreferably show poor appearance, greater odor during forming, and lower mechanical property.

The formed product obtained by melt forming such blend is free of any particular limitation and the shape thereof may be any, such as film, sheet, tape, cup, tray, tube, bottle, pipe, filament, irregular cross-sectional extrude, various undefined formed products and the like. The formed product can be generally effectively used as a regrind layer of multilayer structures as mentioned above.

The laminate and multilayer structure for obtaining a ground product used for a regrind layer are formed by the same method using the same resin as a starting material. That is, a ground product of a multilayer structure is generally used for, but not limited to, a regrind layer of the multilayer structure. A ground product of a different formed product (two or more kinds of formed products may be used) of a laminate using a different EVOH and a different thermoplastic resin) may be used for the regrind layer of such multilayer structure or a mixture of the ground product and a ground product of the multilayer structure may be used for the regrind layer.

Examples of the layer constitution of concrete multilayer structures include thermoplastic resin layer/blend layer/adhesive resin layer/EVOH layer, thermoplastic resin layer/blend layer/adhesive resin layer/EVOH layer/adhesive resin layer/thermoplastic resin layer, thermoplastic resin layer/blend layer/adhesive resin layer/EVOH layer/adhesive resin layer/blend layer/thermoplastic resin layer, further, blend layer/EVOH layer, blend layer/adhesive resin layer/EVOH layer, blend layer/adhesive resin layer/EVOH layer/adhesive resin layer/EVOH layer, blend layer/adhesive resin layer/EVOH layer/adhesive resin layer/thermoplastic resin layer, blend layer/adhesive resin layer/EVOH layer/adhesive resin layer/blend layer/thermoplastic resin layer, thermoplastic resin layer/adhesive resin layer/EVOH layer/blend layer/ EVOH layer/adhesive resin layer/thermoplastic resin layer and the like.

A thermoplastic resin to be used for the thermoplastic resin layer, EVOH to be used for the EVOH layer and an adhesive resin to be used for the adhesive resin layer are free of any particular limitation and those exemplified for the aforementioned laminate can be used.

In addition, each layer of the obtained multilayer structure may contain antioxidants, lubricants, antistatic agents, plasticizers, coloring agents, UV absorbers, antibiotic agents, inorganic or organic fillers and the like, for improved forming processability, physical properties and the like.

The multilayer structure of the above-mentioned can be formed into not only sheet and film but pipe and tube, containers such as tank, bottle etc., and the like, by the above-mentioned co-extrusion forming, co-injection forming, co-extrusion inflation forming, blow forming and the like. Furthermore, it is possible to form the multilayer structure into containers such as bottle, tube, cup, tray etc. and the like by heating the structure again to about 100-150° C. and drawing by applying blow drawing, draw forming (vacuum forming, pneumatic forming, vacuum and pneumatic forming etc.) and the like.

The multilayer structure thus obtained is useful as various containers for general foods, seasonings such as mayonnaise, dressing and the like, fermented foods such as bean paste (miso) and the like, oil and fat foods such as salad oil and the like, beverages, cosmetics, pharmaceutical products, detergents, perfumes, industrial reagents, agrochemicals, fuels and the like. Particularly, it is useful for various containers for semi-solid foods and seasoning such as mayonnaise, ketchup, sauce, bean paste (miso), Japanese horseradish (wasabi), mustard, baste for grilled meat and the like, and the like, bottle containers and tube containers for liquid beverage and seasonings such as salad oil, sweet cooking rice wine (mirin), refined sake, beer, wine, juice, black tea, isotonic drink, mineral water and the like, cup containers for semi-solid foods and seasonings such as jelly, pudding, yogurt, mayonnaise, bean paste (miso) and the like, tray containers for raw meat, livestock meat processed foods (ham, bacon, vienna sausage etc.).

When the resin composition of the present invention is used as an additive for the above-mentioned collected materials, and a pigment is used as an additive for collected materials containing laminate, the compound shows an action effect of improved dispersibility of the pigment. As such pigment, inorganic or organic pigments can be used without any particular limitation. As the inorganic pigment, titanium oxide, calcium carbonate, talc, carbon black and the like can be mentioned and as the organic pigment, phthalocyanine copper and the like can be mentioned.

The present invention is explained in detail in the following by referring to Examples, which are not to be construed as limitative.

In the Examples, "part" and "%" mean weight criteria unless particularly specified.

EXAMPLE 1

LDPE [manufactured by Japan Polychem Corporation "LF440B", MFR 2.8 g/10 min (190° C., 2160 g loading), density 0.925 g/cm$^3$] (A), 0.44 MgO.Mg $(C_{17}H_{35}COO)_2$ [manufactured by Eishin Kasei KK "EM-144"] (B), a saponified product of an ethylene-vinyl acetate copolymer [manufactured by Tosoh Corporation "Melthene H6051", ethylene content 89 mol %, saponification degree of vinyl acetate component 100 mol %, MFR 5.5 g/10 min (210° C., 2160 g loading)] (C) and a hydrotalcite solid solution [manufactured by Kyowa Chemical Industry Co., Ltd. "ZHT4", $Mg_3ZnAl_2(OH)_{12}CO_3.3H_2O$, average particle size 0.4 μm] (D) were melt mixed at a weight ratio of A:B:C: D=70:10:15:5 to give the resin composition of the present invention.

Separately, EVOH [ethylene content 32 mol %, saponification degree 99.6 mol %, MFR 3.5 g/10 min (210° C., loading 2160 g), containing 0.03 wt % of boric acid based on the weight of boron], a thermoplastic resin [polypropylene, manufactured by BP AMOCO Ltd. "AMOCO3143", MFR 2.8 g/10 min (230° C., loading 2160 g)], and an adhesive resin [maleic anhydride-modified LLDPE, manufactured by Rohm And Haas Company "Tymor1203"] were supplied to a co-extrusion multilayer sheet forming machine (manufactured by Gunze Ltd.) and a laminate (multilayer sheet) having a constitution of [inner side] a thermoplastic resin layer/adhesive resin layer/EVOH layer/adhesive resin layer/thermoplastic resin layer [outer side] (thickness 400 μm/25 μm/50 μm/25 μm/500 μm) was extruded. At this time, 4 parts of a master batch [manufactured by Standridge Color Corporation, "WHITE PP315PART#444883"] of a titanium oxide white pigment was mixed in advance per 100 parts of the thermoplastic resin before extrusion.

Then, the obtained laminate was ground with a grinder (diameter 8 mmφ mesh) to give a ground product (apparent density 0.42 g/cc) of the laminate was obtained. The content of EVOH in the ground product of the laminate was 6.1%.

Pellets (5 parts) of the resin composition of the present invention obtained above were added per 100 parts of the ground product of the laminate and the above-mentioned thermoplastic resin (polypropylene) (100 parts) and the above-mentioned white pigment master batch (2 parts) were added and dry blended in a tumbler. The obtained blend was fed into an extruder for inner and outer layers of a co-extrusion multilayer sheet forming machine. In the same manner, a multilayer sheet (multilayer structure) having a constitution of [inner side] regrind (the blend) layer/adhesive resin layer/EVOH layer/adhesive resin layer/regrind (blend) layer [outer side] (thickness 400 μm/25 μm/50 μm/25 μm/500 μm) was prepared, which was ground in the same manner, and the resin composition of the present invention (5 parts), the above-mentioned thermoplastic resin (polypropylene) (100 parts) and the above-mentioned white pigment master batch (2 parts) were added and a multilayer sheet was obtained in the same manner. This process was repeated 20 times and the following evaluation was performed.

The content of EVOH in the ground product (the blend) of the multilayer structure was 8.4% for the first time, 9.8% for the 20th time and the content of EVOH in all such processes was in the range of 6.1-9.8%.

During the above-mentioned steps, the following evaluation was performed.

(Long-run Formability)

The appearance of the multilayer sheet after 20 repeats of the above-mentioned operation was visually observed and evaluated as follows.

(1) Surface Smoothness

The regrind layer of the multilayer sheet surface was visually observed and evaluated according to the following criteria.

◯ . . . line, wavy pattern or lower transparency is hardly observed

Δ . . . line, wavy pattern or lower transparency is somewhat observed x . . . line, wavy pattern or lower transparency is markedly observed (2) Fish Eye The number of fish eyes having a diameter of not less than 0.4 mm, which were produced in the regrind layer (per 100 cm$^2$) was counted from the surface of a multilayer sheet, and evaluated according to the following criteria. The number was counted at 5 points on the multilayer sheet and average number was calculated.

○ . . . less than 2

Δ . . . 2-4 x . . . 5 or more (3) Pigment Dispersibility

The average number of pigment aggregates having an visually observable size (diameter of not less than 0.1 mm) in the regrind layer (per 100 cm$^2$) was counted from the surface of a multilayer sheet, and evaluated according to the following criteria. The number was counted at 5 points on the multilayer sheet and average was calculated.

○ . . . less than 2

Δ . . . 2-4 x . . . 5 or more (Suppression of Foreign Substance Due to Phase Separation, i.e., Die Build-up)

The frequency of mixing of die build-up in a regrind layer during 20 repeats of the above-mentioned forming operation was observed and evaluated according to the following criteria.

○ . . . less than twice of die build-up mixing

Δ . . . 2-4 times of die build-up mixing x . . . more than 10 times of die build-up mixing Furthermore, in the above-mentioned production of multilayer sheet, a transparent multilayer sheet was produced without adding a white pigment, and the finally obtained multilayer sheet was subjected to the following evaluation.

(4) Surface Smoothness

The regrind layer of the multilayer sheet surface was visually observed and evaluated according to the following criteria.

○ . . . line, wavy pattern or lower transparency is hardly observed

Δ . . . line, wavy pattern or lower transparency is somewhat observed x . . . line, wavy pattern or lower transparency is markedly observed (5) Fish Eye The number of fish eyes having a diameter of not less than 0.4 mm, which were produced in the regrind layer (per 100 cm$^2$) was counted from the surface of a multilayer sheet, and evaluated according to the following criteria. The number was counted at 5 points on the multilayer sheet and average was calculated.

○ . . . less than 2

Δ . . . 2-4 x . . . 5 or more

The multilayer sheet obtained in the above was subjected to heat-draw forming of a cup (upper surface 65 mmφ, bottom surface 60 mmφ, depth 55 mm) using a plug assist type vacuum and pneumatic forming machine (manufactured by Asano Laboratories) under the conditions of heater temperature of 500° C. and sheet surface temperature of 145° C. to give a multilayer container (cup). The temperature of the sheet surface was controlled by adjusting the heating time of the heater.

The obtained heat-draw formed multilayer container (cup) was subjected to the following evaluation.

(Transparency)

The side surface of the cup obtained above was measured for haze value by a turbidimeter and evaluated according to the following criteria.

○ . . . haze value of less than 10

Δ . . . haze value of not less than 10 and less than 15 x . . . haze value of not less than 15

(Gas Barrier Property)

The upper surface of the cup obtained above was sealed with an aluminum metal board and measured for oxygen permeability (using "OXTRAN10/50" manufactured by Modern Control, Inc. under the conditions of cup inner side: 23° C., 100% RH, cup outer side: 23° C., 50% RH).

EXAMPLE 2

In the same manner as in Example 1 except that "Melthene H6960" manufactured by Tosoh Corporation [ethylene content 82 mol %, saponification degree of vinyl acetate component 90 mol %, MFR 40 g/10 min (210° C., 2160 g loading)] was used as a saponified product of an ethylene-vinyl acetate copolymer (C), the resin composition of the present invention was obtained, and subjected to a similar evaluation.

EXAMPLE 3

In the same manner as in Example 1 except that "FY6C" manufactured by Japan Polychem Corporation [PP, MFR 2.4 g/10 min (190° C., 2160 g loading), density 0.90 g/cm$^3$] (A) was used instead of LDPE (A), the resin composition of the present invention was obtained and subjected to a similar evaluation.

EXAMPLE 4

In the same manner as in Example 1 except that 0.12 MgO.Mg (C$_{17}$H$_{35}$.COO)$_2$ [manufactured by Eishin Kasei KK "EM-112"] was used as metal soap (B), the resin composition of the present invention was obtained, and subjected to a similar evaluation.

EXAMPLE 5

In the same manner as in Example 1 except that Mg$_{4.5}$Al$_2$ (OH)$_{13}$CO$_3$.3.5H$_2$O ["DHT-4A" manufactured by Kyowa Chemical Industry Co., Ltd., average particle size 0.4 μm] was used as hydrotalcite (D), the resin composition of the present invention was obtained, and subjected to a similar evaluation.

EXAMPLE 6

In the same manner as in Example 1 except that the content of (A)-(B) was changed to the weight ratio of A:B:C:D=69.7:14.9:14.9:0.5, the resin composition of the present invention was obtained, and subjected to a similar evaluation.

COMPARATIVE EXAMPLE 1

In the same manner as in Example 1 except that the resin composition of the present invention was not contained in the regrind layer, a similar evaluation was performed.

The evaluation results of Examples and Comparative Examples are shown in Tables 1 and 2.

TABLE 1

| | Long-run formability | | | Suppression of die build-up | Long-run formability | |
| --- | --- | --- | --- | --- | --- | --- |
| | (1) | (2) | (3) | | (4) | (5) |
| Example 1 | ◯ | ◯ | ◯ | ◯ | ◯ | ◯ |
| Example 2 | ◯ | ◯ | ◯ | ◯ | ◯ | ◯ |
| Example 3 | ◯ | ◯ | ◯ | ◯ | ◯ | ◯ |
| Example 4 | ◯ | ◯ | ◯ | ◯ | ◯ | ◯ |
| Example 5 | ◯ | ◯ | ◯ | ◯ | ◯ | ◯ |
| Example 6 | ◯ | ◯ | ◯ | ◯ | ◯ | ◯ |
| Comparative Example 1 | x | x | x | x | x | x |

TABLE 2

| | transparency | gas barrier property (cc/cup · day · air) |
| --- | --- | --- |
| Example 1 | ◯ | 0.002 |
| Example 2 | ◯ | 0.002 |
| Example 3 | ◯ | 0.002 |
| Example 4 | ◯ | 0.002 |
| Example 5 | ◯ | 0.002 |
| Example 6 | ◯ | 0.002 |
| Comparative Example 1 | x | 0.012 |

The resin composition of the present invention shows superior long-run formability (surface smoothness, suppression of fish eye, pigment dispersibility), suppressive effect on die build-up and superior transparency and gas barrier property when added to a regrind layer during formation of a laminate having the regrind layer. Therefore, the composition is highly useful as an additive for collected materials (regrind) for forming various laminates.

This application is based on application No. 2002-334876 filed in Japan, the contents of which are incorporated hereinto by reference.

What is claimed is:

1. A resin composition comprising a polyolefin resin (A), a metal soap (B) of the following formula (1), which is obtained by a heat reaction by a dry direct method of one or more kinds of aliphatic monocarboxylic acid having 12 to 30 carbon atoms and an oxide or hydroxide of group II metal of the periodic table, a saponified product (C) of an ethylene-vinyl acetate copolymer having an ethylene content of 82-95 mol % and a saponification degree of a vinyl acetate component of not less than 85 mol %, and a hydrotalcite compound and/or a hydrotalcite solid solution (D):

$$\alpha MO \cdot M(OOCR)_2 \qquad (1)$$

wherein α is a number of 0.1-1.0, M is a divalent metal of group II of the periodic table, and R is a saturated or unsaturated alkyl group having 11 to 29 carbon atoms.

2. The resin composition of claim 1, wherein the content of the metal soap (B) in the resin composition is 0.005-20 wt %.

3. The resin composition of claim 1, wherein the content ratio of the polyolefin resin (A) and the saponified product of an ethylene-vinyl acetate copolymer (C), (A/C), is 95/5-30/70 (weight ratio).

4. The resin composition of claim 2, wherein the content ratio of the polyolefin resin (A) and the saponified product of an ethylene-vinyl acetate copolymer (C), (A/C), is 95/5-30/70 (weight ratio).

5. The resin composition of claim 1, which is added to a collected material of a laminate comprising a layer containing a saponified product of an ethylene-vinyl acetate copolymer having an ethylene content of 20-65 mol % and a saponification degree of a vinyl acetate component of not less than 90 mol %.

6. The resin composition of claim 2, which is added to a collected material of a laminate comprising a layer containing a saponified product of an ethylene-vinyl acetate copolymer having an ethylene content of 20-65 mol % and a saponification degree of a vinyl acetate component of not less than 90 mol %.

7. The resin composition of claim 3, which is added to a collected material of a laminate comprising a layer containing a saponified product of an ethylene-vinyl acetate copolymer having an ethylene content of 20-65 mol % and a saponification degree of a vinyl acetate component of not less than 90 mol %.

8. The resin composition of claim 4, which is added to a collected material of a laminate comprising a layer containing a saponified product of an ethylene-vinyl acetate copolymer having an ethylene content of 20-65 mol % and a saponification degree of a vinyl acetate component of not less than 90 mol %.

9. A composition comprising a ground laminate comprising a thermoplastic resin layer and a layer of a saponified product of an ethylene-vinyl acetate copolymer and the resin composition of claim 1.

10. A composition comprising a ground laminate comprising a thermoplastic resin layer and a layer of a saponified product of an ethylene-vinyl acetate copolymer and the resin composition of claim 2.

11. A composition comprising a ground laminate comprising a thermoplastic resin layer and a layer of a saponified product of an ethylene-vinyl acetate copolymer and the resin composition of claim 3.

12. A composition comprising a ground laminate comprising a thermoplastic resin layer and a layer of a saponified product of an ethylene-vinyl acetate copolymer and the resin composition of claim 4.

13. The resin composition of claim 1, wherein the saponified product (C) of an ethylene-vinyl acetate copolymer has an ethylene content of 82-92 mol % and a saponification degree of a vinyl acetate component of not less than 85 mol %.

* * * * *